United States Patent [19]

Wetter et al.

[11] Patent Number: 5,294,183

[45] Date of Patent: Mar. 15, 1994

[54] SHOCK ABSORBER FOR VEHICLE SEAT BELT

[75] Inventors: Hermann Wetter, Ulm; Waldemar Czernakowski, Blaustein, both of Fed. Rep. of Germany

[73] Assignee: Britax Romer Kindersicherheit GmbH

[21] Appl. No.: 837,341

[22] Filed: Feb. 14, 1992

[30] Foreign Application Priority Data

Feb. 23, 1991 [GB] United Kingdom ............... 9103841

[51] Int. Cl.⁵ ............................................. B60R 22/16
[52] U.S. Cl. ................. 297/472; 297/216.11; 297/488
[58] Field of Search ........... 297/472, 471, 470, 488, 297/464, 250.1, 216.1, 216.11, 216.13; 280/805, 801 R, 808

[56] References Cited

U.S. PATENT DOCUMENTS

| | | | |
|---|---|---|---|
| 3,446,533 | 5/1969 | Radke et al. | 297/472 |
| 3,512,830 | 5/1970 | Norman et al. | 297/250 |
| 3,883,053 | 5/1975 | Pritchard et al. | 297/471 X |
| 4,027,905 | 6/1977 | Shimogawa et al. | 280/805 X |
| 5,005,866 | 4/1991 | Reedom | 280/801 |
| 5,016,915 | 5/1991 | Perry | 280/808 X |
| 5,050,906 | 9/1991 | Kneip | 280/805 |
| 5,074,588 | 12/1991 | Huspen | 280/808 X |
| 5,135,257 | 8/1992 | Short | 280/808 |

FOREIGN PATENT DOCUMENTS

| | | | |
|---|---|---|---|
| 2126086 | 12/1972 | Fed. Rep. of Germany | 280/805 |
| 3204121 | 8/1983 | Fed. Rep. of Germany . | |
| 8524648 | 11/1985 | Fed. Rep. of Germany . | |
| 1419301 | 12/1975 | United Kingdom | 297/472 |
| 1488825 | 10/1977 | United Kingdom | 297/470 |

*Primary Examiner*—Kenneth J. Dorner
*Assistant Examiner*—Milton Nelson, Jr.
*Attorney, Agent, or Firm*—Davis, Bujold & Streck

[57] ABSTRACT

A shock absorber for a vehicle seat belt comprises a flexible crushable pad adapted to be positioned between the shoulder strap of a seat belt and the shoulder of a user. Separable attachment means secures the crushable pad in a predetermined position in relation to a seat back. The attachment means permits movement of the pad further from said seat back on application of a predetermined force, e.g. in an accident.

2 Claims, 4 Drawing Sheets

SHOCK ABSORBER FOR VEHICLE SEAT BELT

FIELD

This invention relates to a shock absorber for a vehicle seat belt comprising at least one crushable pad on a flexible backing adapted to be positioned between the shoulder strap of a seat belt and the shoulder of a user.

RELATED ART

BE-A-849336 discloses a shock absorber of this type comprising a resilient backing carrying a pad of cellular foam which is secured to the directly to the shoulder strap of the seat belt so that the backing abuts the belt and the pad rests on the shoulder of the user. It is an object of the invention to provide means for ensuring that such a pad is correctly positioned on the user's shoulder when the seat belt is fastened and that it remains in this position during normal use.

SUMMARY OF THE INVENTION

According to the invention, a shock absorber of the type described above is provided with separable attachment means for securing the crushable pad in a predetermined position in relation to a seat back, the attachment means being adapted to permit movement of the pad further from said seat back on application of a predetermined force.

In normal use, this arrangement keeps the crushable pad correctly positioned on the user's shoulder. In the event of an accident, there is more friction between the pad and the user's shoulder than between the pad and the shoulder strap of the seat belt. This keeps the pad firmly in position, the attachment means becoming disconnected if necessary. Consequently, the pad is correctly positioned to protect the user's collar bone at times of maximum deceleration.

In one form of the invention, the attachment means may take the form of a clip which is adapted to become detached when said predetermined force is applied.

When the invention is applied to a child's safety seat having a shoulder strap projecting through a slot in the seat back, the clip may be arranged to engage in said slot. When the pad is mounted on a flexible backing, the clip may take the form of an extension of the flexible backing which has a T-shaped formation on its end which engages beyond the ends of the slot. Stiffening material may be provided in the T-shaped formation so as to give it sufficient rigidity to prevent the shoulder pad from becoming detached from the seat back prematurely.

Alternatively, the clip may have a pair of arms which are resiliently urged apart from each other, each arm having a formation arranged to engage with a respective edge of the slot.

In another form of the invention, the crushable pad is connected to the seat back by fabric adapted to tear when said predetermined force is applied.

In a further form of the invention, the crushable pad is connected to a seat cover which is arranged to stretch and/or become detached from the seat back when said predetermined force is applied.

Whenever the invention is applied to a child's safety seat with a harness having two shoulder straps, it is preferable to provide a separate shoulder pad for each shoulder strap.

DETAILED DESCRIPTION OF THE PREFERRED EMBODIMENT

Figure 1:
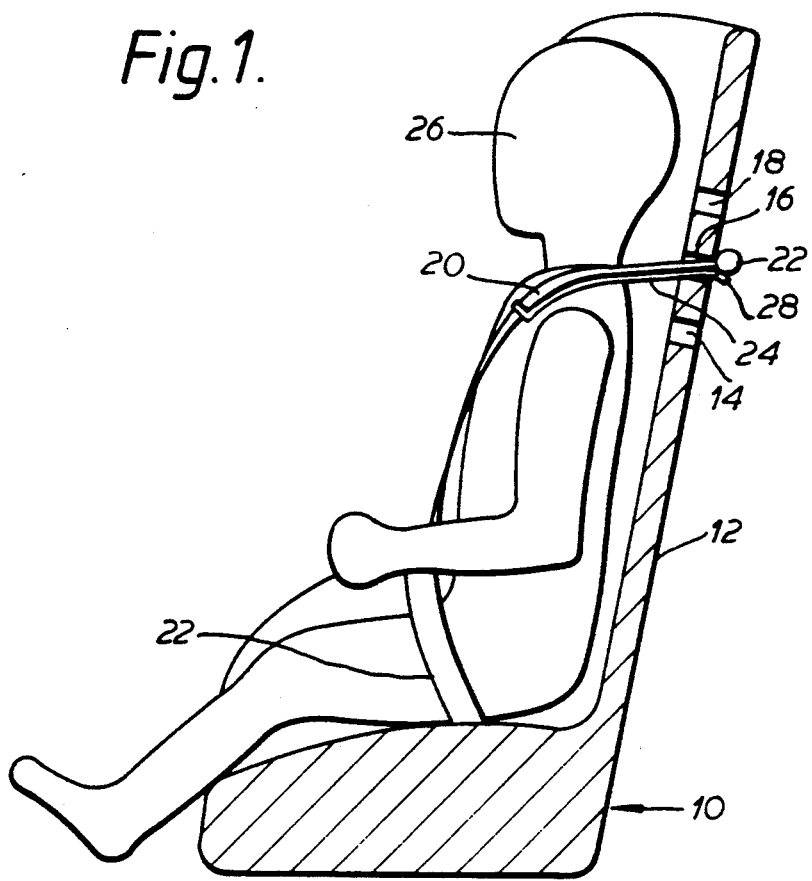
FIG. 1 is a transverse sectional view of a child's safety seat having a crushable pad in accordance with a first embodiment of the invention.

FIG. 1 shows a child's seat 10 having a seat back 12 with slots 14, 16 and 18 providing alternative locations at which a shoulder strap 20 of a harness may project through the seat back 12. The harness which also incorporates a lap strap 22 and corresponding shoulder and lap straps (not shown) on the other side of the seat. In the drawing, the end of the shoulder strap 20 behind the seat back 12 is coupled to a bar 22 which is both longer and wider than the slot 16. Alternatively, it may extend behind the seat back 12 to strap adjustment means to facilitate adjustment of its length.

Figure 2:
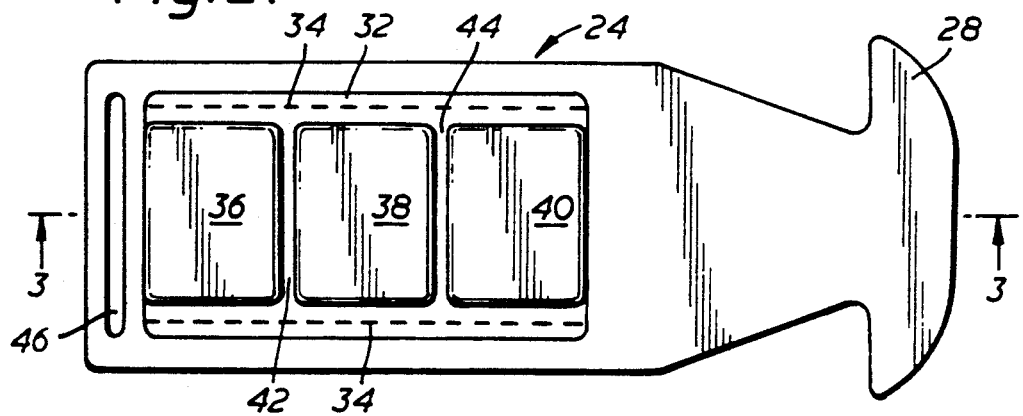
FIG. 2 is a plan view from below of the crushable pad shown in FIG. 1.
Figure 3:
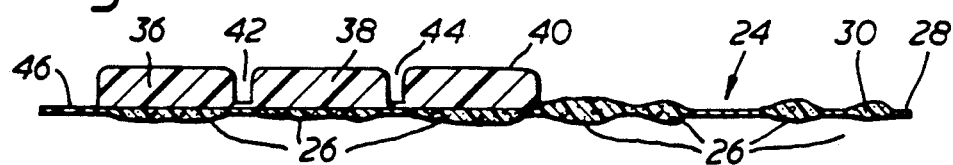
FIG. 3 is a cross-sectional view taken on the line 3—3 in FIG. 2.

In accordance with the invention, a crushable shoulder pad 24 is positioned between the shoulder strap 20 and the shoulder of an occupant 26 of the seat 10. As can be seen from FIGS. 2 and 3, the shoulder pad 24 comprises two layers of fabric with plastics foam material 26 in selected zones therebetween. At one end, the backing has a T-shaped formation 28 which, when positioned as illustrated in FIG. 1, projects beyond the ends of the slot 16. The T-shaped portion 28 is given a limited amount of rigidity by reinforcement material which, in the embodiment illustrated, is plastics foam similar to that in zones 26.

On the side of the pad 24, which abuts against the shoulder of the child 26, the backing material carries a pad 32 formed from resilient crushable material such as polyethylene foam. The pad 32 is attached to the backing material by stitching 34 and has three raised zones 36, 38 and 40 separated by grooves 42 and 44. The grooves 42 and 44 allow the pad to bend round the shoulder of the child 26.

At the opposite end to the T-shaped formation 28, the shoulder pad 24 has a slot 46 through which the shoulder strap 20 is threaded in order to maintain it in lateral alignment with the shoulder pad 24.

In the event of an accident, the pad 24 is trapped firmly against the shoulder of the child 26. If the child's shoulder moves relative to the shoulder strap 20, the T-shaped formation 28 is pulled through the slot 16, allowing the raised energy absorbing zones 36, 38 and 40 to remain correctly positioned on the child's shoulder.

Figure 4:
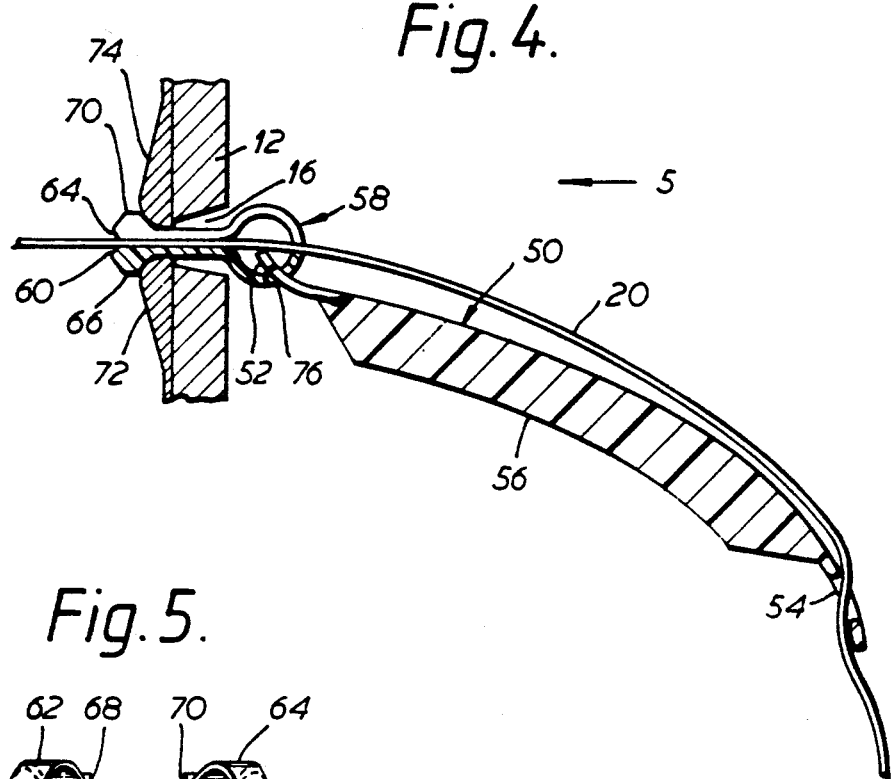
FIG. 4 is a cross-sectional view of a crushable seat pad connected to a child safety seat by a clip, in accordance with the second embodiment of the invention.

FIG. 4 illustrates a crushable shoulder pad 50 which is similar to the pad 24 in that it has a T-shaped formation 52 at one end, similar to the T-shaped formation 28, and a slot 54 at the other end, similar to the slot 56. However, in place of the separate raised zones 36, 38 and 40, a strip 56 of crushable material extends most of the length of the pad 50. The pad 50 is connected to the seat back 12 by a clip 58 formed of resilient plastics material.

Figure 5:
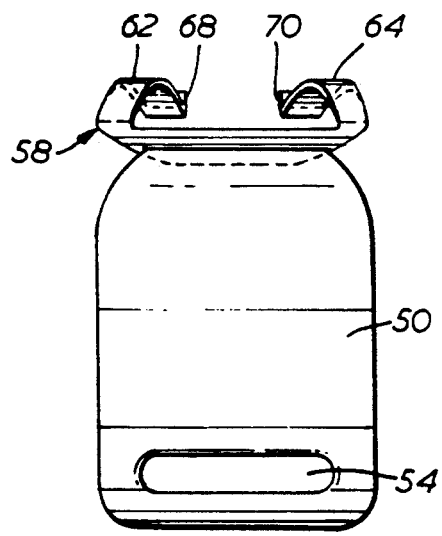
FIG. 5 is a elevational view, taken in the direction of the arrow 5 in FIG. 4, of the pad and clip.
Figure 6:
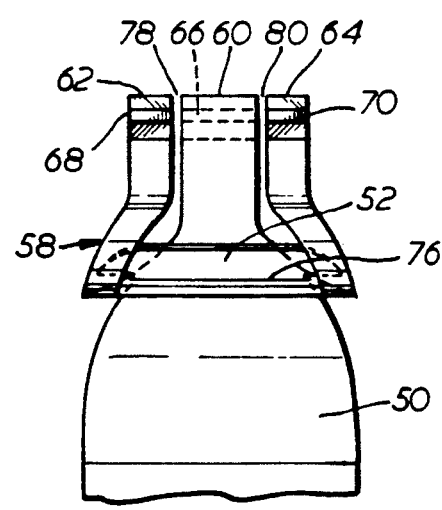
FIG. 6 is a plan view of the clip in the adjacent end of the pad shown in FIG. 5.

Referring also to FIGS. 5 and 6, the clip 58 is generally U-shaped having a lower central limb 60 and two upper side limbs 62 and 64, the free ends of all three of which project through the slot 16 in the seat back and have respective outwardly directed detent formations 66, 68 and 70 which engage with complementary formations 72 and 74 on the rear side of the seat back 12. The T-shaped formation 52 on the shoulder pad 50 projects through a slot 76 in the central limb 60 of the clip adjacent to the location at which it is connected to the side limbs 62 and 64.

The shoulder belt 20 extends above the central limb 60 of the clip 58, between the side limbs 62 and 64 adjacent to the location at which they are connected to the central limb 60 and below the side limbs 62 and 64 adjacent to free three ends. When the free ends of the three limbs 60, 62 and 64 pass through the slot 16 in the seat back 12, they move into horizontal alignment with one another, the shoulder belt 20 folding in the openings 78 and 80 (FIG. 6) between them.

Figure 7:
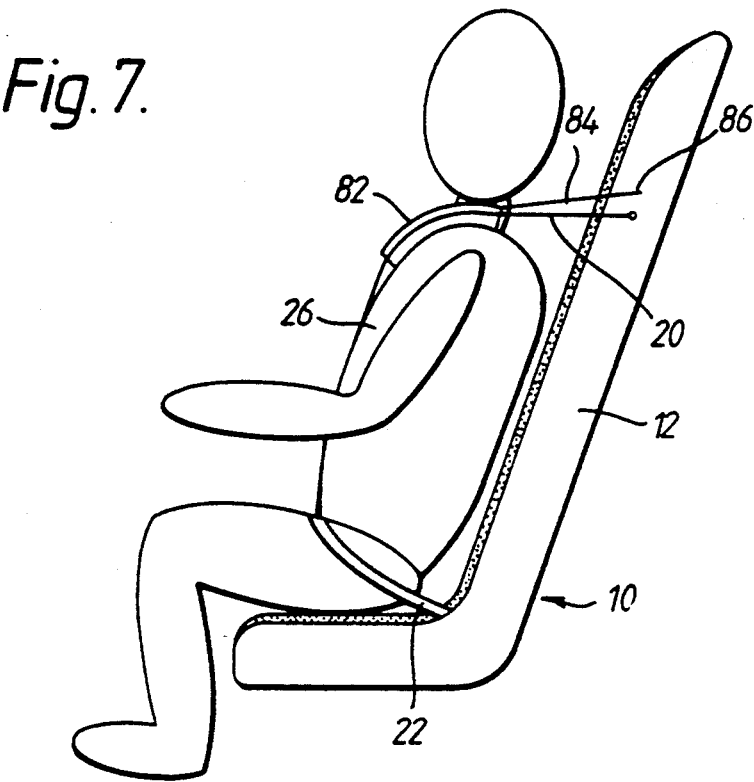
FIG. 7 is a transverse sectional view, similar to FIG. 1, illustrating a third embodiment of the invention.

FIG. 7 illustrates a further embodiment of the invention. The shoulder strap 20 of the harness is attached to the seat back 12 in a similar manner to that illustrated in FIG. 1. The shoulder strap 20 is provided with a shoulder pad 82 which is similar to the pad 24 illustrated in FIGS. 2 and 3 except that, in place of the T-shaped portion 28, it has a flexible tether portion 84 which is attached to the seat back 12 at point 86 by stitching which is arranged to tear on application of a predetermined force. If, during an accident, the occupant 26 moves forwards, as illustrated in FIG. 8, the tether portion 84 tears away from the seat back 12.

Figure 8:
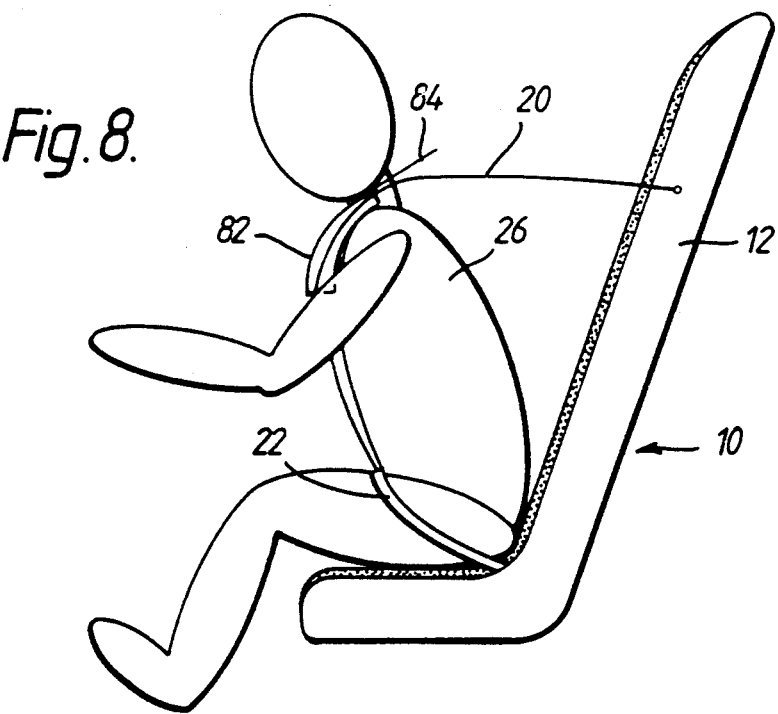
FIG. 8 is a transverse sectional view of the embodiment of the invention shown in FIG. 7 in the course of being subjected to sudden deceleration.
Figure 9:
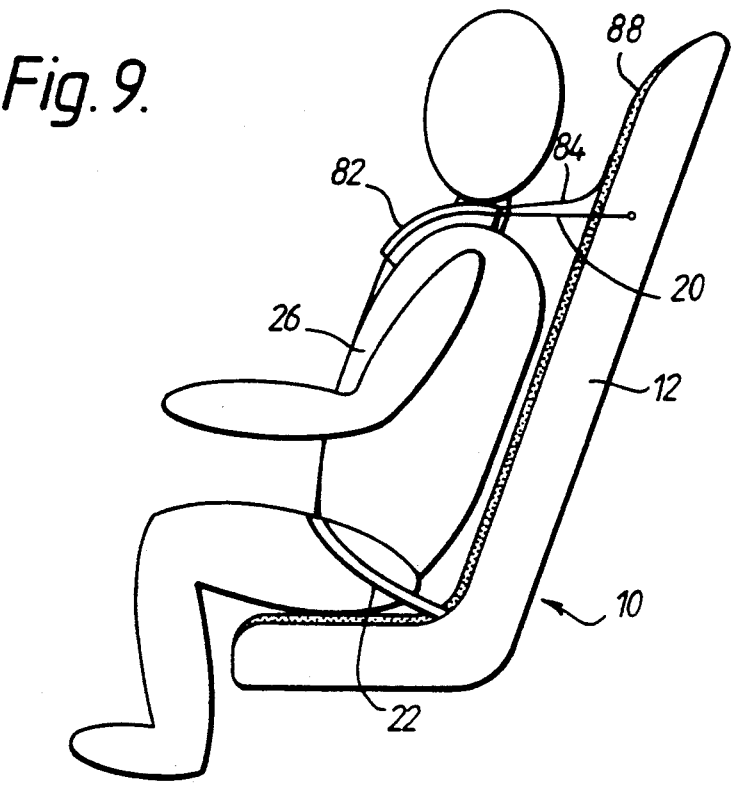
FIGS. 9 and 10 are transverse sectional views, similar to FIGS. 7 and 8, illustrating a fourth embodiment of the invention.
Figure 10:
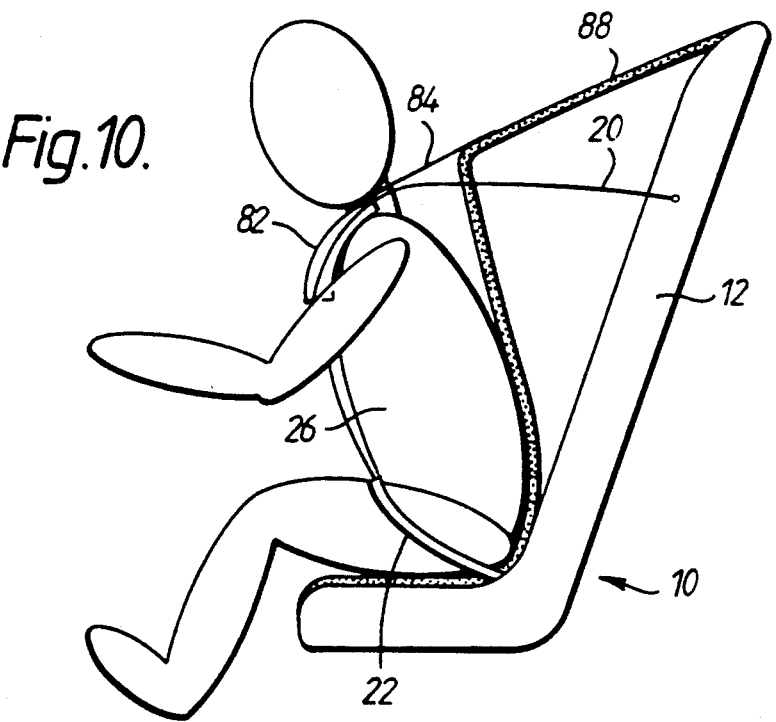

FIGS. 9 and 10 illustrate a further embodiment which differs from the embodiment illustrated in FIGS. 8 and 9 in that the seat 10 has a stretchable seat cover 88 to which the tether portion 84 is permanently sewn. In the event of the occupant 26 moving forwards during an accident, the cover 88 stretches away from the seat back 12, allowing the pad 82 to move forwards with the shoulder of the occupant while remaining attached to the cover 88.

What is claimed is:

1. A shock absorber in combination with a child's safety seat having a shoulder strap projecting through a slot in the seat back, comprising a flexible crushable pad adapted to be positioned between the shoulder strap of a seat belt and the shoulder of a user, and a clip arranged to engage in said slot to secure the crushable pad in a predetermined position in relation to a seat back, the clip being adapted to become detached to permit movement of the pad further from said seat back on application of a predetermined force, wherein the pad is mounted on a flexible backing and the clip comprises an extension of the flexible backing having a T-shaped formation on its end which engages beyond the ends of the slot.

2. A child's vehicle seat having a seat back, a seat belt for said seat including a shoulder strap projecting through a slot in said seat back, and a shock absorber comprising a flexible crushable pad slidably mounted on the shoulder strap so as to be positioned between the shoulder strap and a user's shoulder, and a T-shaped formation on one end of the pad, the T-shaped formation projecting through and engaging beyond the ends of the slot in the seat back to maintain the crushable pad in a predetermined position relative to the seat back as the seat belt is fastened, the T-shaped formation being adapted to become detached from the slot so as to permit movement of the pad further from said seat back on application of a predetermined force so that the pad is maintained in a substantially constant position relative to the user by friction between the pad and the user's shoulder in the event of forward movement of the user's shoulder relative to the seat back.

* * * * *